(12) United States Patent  (10) Patent No.: US 11,524,225 B2
Ironmonger et al.  (45) Date of Patent: Dec. 13, 2022

(54) GAMES CONTROLLER

(71) Applicant: Ironburg Inventions Limited, Wincanton (GB)

(72) Inventors: Duncan Ironmonger, Milton, GA (US); Carl Jeffrey, Cheltenham (GB)

(73) Assignee: Ironburg Inventions Limited, Shepshed (GB)

( * ) Notice: Subject to any disclaimer, the term of this patent is extended or adjusted under 35 U.S.C. 154(b) by 119 days.

(21) Appl. No.: 17/151,355

(22) Filed: Jan. 18, 2021

(65) Prior Publication Data

US 2021/0170271 A1 Jun. 10, 2021

Related U.S. Application Data

(63) Continuation of application No. 15/767,023, filed as application No. PCT/EP2016/074111 on Apr. 9, 2018, now Pat. No. 10,940,386.

(60) Provisional application No. 62/239,517, filed on Oct. 9, 2015.

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
CPC ........ A63F 13/24; A63F 13/20; A63F 13/245; A63F 2300/1043; A63F 2300/10

USPC ..................................................... 463/37, 38
See application file for complete search history.

(56) References Cited

U.S. PATENT DOCUMENTS

| 8,241,126 | B2 * | 8/2012 | Ambinder | A63F 13/24 463/38 |
| 9,029,721 | B2 * | 5/2015 | Ikeda | A63F 13/24 200/341 |
| 2009/0298590 | A1 * | 12/2009 | Marks | A63F 13/02 463/37 |
| 2011/0275436 | A1 * | 11/2011 | Kidakarn | A63F 13/803 463/37 |
| 2015/0157949 | A1 * | 6/2015 | Durling, Jr. | A63F 13/24 463/47 |

FOREIGN PATENT DOCUMENTS

GB 2 204 387 11/1988

* cited by examiner

*Primary Examiner* — Allen Chan
(74) *Attorney, Agent, or Firm* — Walters & Wasylyna LLC

(57) ABSTRACT

The invention provides an improved controller (10) for a games console. The invention is a games controller (10) that is intended to be held by a user in both hands. Additionally, the controller of the invention (10) may comprise a plurality of controls located on the front and top of the controller. The controller of the present invention (10) is advantageous as it additionally comprises an actuator mounted to one of the plurality of controls located on the front of the controller.

20 Claims, 13 Drawing Sheets

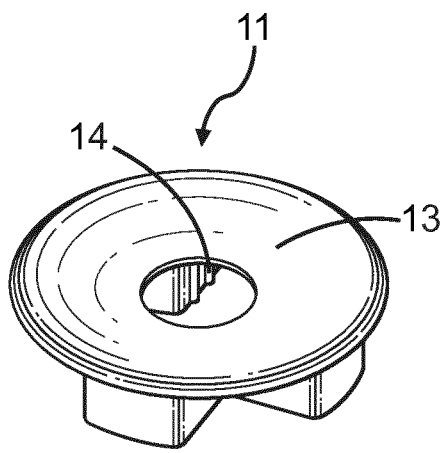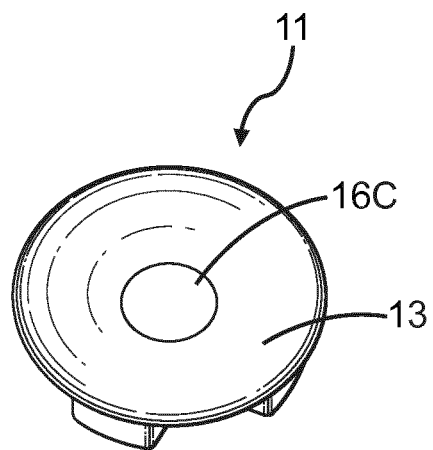
FIGURE 3A
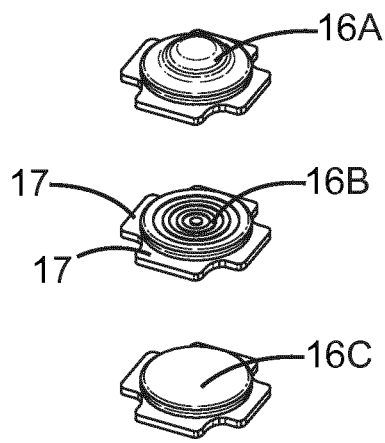
FIGURE 3B
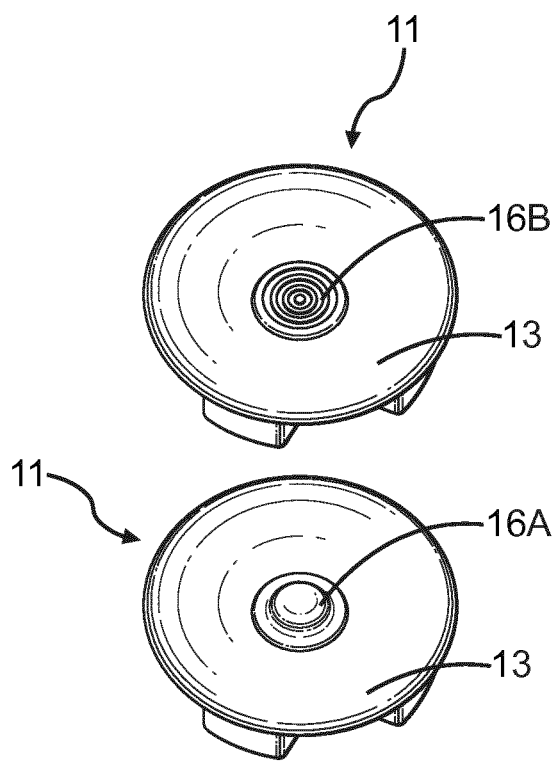
FIGURE 3D

GAMES CONTROLLER

This application is a continuation of U.S. Ser. No. 15/767,023 filed on Apr. 9, 2018, which is the U.S. national phase entry of Intl. App. No. PCT/EP2016/052827 filed on Oct. 7, 2016, which claims priority from U.S. Ser. No. 62/239,517 filed on Oct. 9, 2015. The entire contents of U.S. Ser. No. 15/767,023, Intl. App. No. PCT/EP2016/052827 and U.S. Ser. No. 62/239,517 are incorporated herein by reference.

FIELD OF THE INVENTION

The invention relates to controllers for controlling the play of computerised games; more particularly, but not exclusively, the invention relates to an actuator system of a game controller for a gaming console.

BACKGROUND OF THE INVENTION

There are many different types of gaming consoles currently available for operating a video game. For example, Microsoft®, Sony® and Nintendo® manufacture the Xbox®, Playstation® and Wii® gaming consoles, respectively. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command.

It is known to provide a button, actuator, or other controls, on the front and top of the controller. Controls mounted on the top of the controller are intended to be operable by the index fingers of a user; such buttons are commonly known as triggers or bumpers. Controls mounted on the front of the controller are intended to be operable by the thumbs of a user; such controls may include left and right analogue thumb sticks, which normally control movement and are intended to be operated by the user's left and right thumbs respectively. There may be additional buttons located on a forward right portion of the front of the controller, which normally control additional actions and are intended to be operated by the user's right thumb.

A further actuator in the form of a direction pad (D-pad) or control pad may be located on the rearward left portion of the front of the controller. The direction pad is intended to be operated by the user's thumb, typically the direction pad is employed as either an alternative control to one of the thumb sticks or to provide additional functionality or actions not provided by the thumb sticks. Such actuators are typically a four-way directional control with one switch mechanism arranged on each point of a cross. The direction pad may be digital; in other words, only the directions provided on the D-pad buttons can be used, with no intermediate values.

However, combinations of two directions (up and left, for example) can provide diagonals such that a direction pad having four actuators can be used to provide eight-directional input. The direction pads are typically arranged such that they do not protrude far from the front of the controller or at least they do not protrude from the front of the controller as far as the thumb sticks protrude.

The different elevations of direction pads and thumb sticks above the front of the controller can increase the time period required for a user to switch between the controls. It may also introduce inaccuracy, for example increasing the likelihood of a user unintentionally interacting with the thumbstick or direction pad or misplacing their thumb upon the control so as to send an inaccurate or unintended directional input instruction.

The controllers typically have a pair of handles or grip portions to enable a user to hold the controller; typically the user will employ the middle, ring and/or little finger of each hand to grasp a respective handle.

Due to the rapidly expanding gaming market and development of involved games invoking considerable player input, it is desirable for players to be able to customise their controllers in order to gain increased control in a variety of gaming circumstances.

The present invention seeks to improve upon, or at least mitigate, some of the problems associated with controllers of the prior art by providing a game controller

SUMMARY

A first aspect of the present disclosure provides an apparatus for supplying user inputs to a computer program, such as a game program, for controlling the game program. The apparatus comprising a case and a plurality of controls located on a front of the apparatus. At least one first actuator may be mounted to one of the plurality of controls. A grip member may be mounted to the at least one first actuator.

Optionally, the apparatus is shaped to be held in both hands of a user such that the user's thumbs are positioned to operate controls located on the front of the apparatus.

Optionally, the one of the plurality of controls is in a position operable by a thumb of a user.

In some embodiments, the at least one first actuator is removably mounted to the apparatus.

Optionally, the at least one first actuator is secured to the one of the plurality of controls by a friction fit.

In some embodiments, the one of the plurality of controls is a direction pad.

Optionally, a first one of the plurality of controls is disposed proximate a second control operable by a thumb of a user.

In some embodiments, the at least one first actuator comprises a plate and the grip member is received in a first orifice provided in the plate.

Optionally, the at least one first actuator comprises a mounting which defines a second orifice, a portion of said one of the plurality of controls being received in the orifice.

Optionally, the grip member is centrally disposed on the plate.

Optionally, the grip member comprises a plurality of grip elements disposed about the periphery of the plate. The plurality of grip elements may be coupled together.

Optionally, the grip member is detachably mounted to the at least one first actuator.

In some embodiments, the apparatus comprises a plurality of controls located on a top of the apparatus and the apparatus is shaped to be held in both hands of a user such that the user's index fingers are positioned to operate controls located on the top of the apparatus.

A second aspect of the present disclosure provides an apparatus for supplying user inputs to a computer program, such as a game program, for controlling the game program, the apparatus comprising a case and a plurality of controls located on a front of the apparatus. At least one first actuator may be mounted to the one of the plurality of controls. The at least one first actuator may comprise a plate mounted to a mounting, the plate may be arranged so as to be disposed at an inclination to the case.

A third aspect of the present disclosure provides an apparatus for supplying user inputs to a computer program, such as a game program, for controlling the game program, the apparatus comprising a case and a plurality of controls located on a front of the apparatus. At least one first actuator may be mounted to the one of the plurality of controls. The at least one first actuator may comprise a plate and a mounting the plate being rotatably mounted on the mounting.

Optionally, the plate is rotatably mounted, about at least two orthogonal axes, to the mounting.

Optionally, the at least one first actuator comprises a securing mechanism for securing the plate in a given orientation with respect to the mounting.

Optionally, the plate is pivotally mounted to the mounting so as to be configurable at an inclination with respect to the mounting.

In some embodiments, the plate is mounted to the mounting by a ball and socket mechanism.

Optionally, the plate comprises a ball mount.

Optionally, the mounting comprises a socket.

In some embodiments, the ball and socket mechanism comprises a securing mechanism.

Optionally, the securing mechanism comprises a bore in communication with the socket and set screw received within the bore.

Optionally, the set screw comprises a first end bearing against the ball.

A fourth aspect of the present disclosure provides an actuator for use with apparatus for supplying user inputs to a computer program, such as a game program, for controlling the game program, the apparatus comprising a case and a plurality of controls located on a front of the apparatus. The actuator may comprise a mounting for mounting the actuator to one of the plurality of controls and a grip member mounted to the actuator.

A fifth aspect of the present disclosure provides an actuator for use with apparatus for supplying user inputs to a computer program, such as a game program, for controlling the game program, the apparatus comprising a case and a plurality of controls located on a front of the apparatus. The actuator may comprise a mounting for mounting the actuator to one of the plurality of controls and a plate mounted to the mounting, the plate being arranged so as to be disposed at an inclination to the case.

A sixth aspect of the present disclosure provides an actuator for use with apparatus for supplying user inputs to a computer program, such as a game program, for controlling the game program, the apparatus comprising a case and a plurality of controls located on a front of the apparatus. The actuator may comprise a mounting for mounting the actuator to one of the plurality of controls; and a plate rotatably mounted to a mounting.

In some embodiments the apparatus is a games controller. Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIGS. 3A to 3D are perspective views of an actuator according to a first embodiment for being employed with the controller of FIG. 1;

DETAILED DESCRIPTION OF EMBODIMENTS

Detailed descriptions of specific embodiments of game controllers and actuators or controls are disclosed herein. It will be understood that the disclosed embodiments are merely examples of the way in which certain aspects of the invention can be implemented and do not represent an exhaustive list of all of the ways the invention may be embodied. Indeed, it will be understood that the game controllers and actuators or controls described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
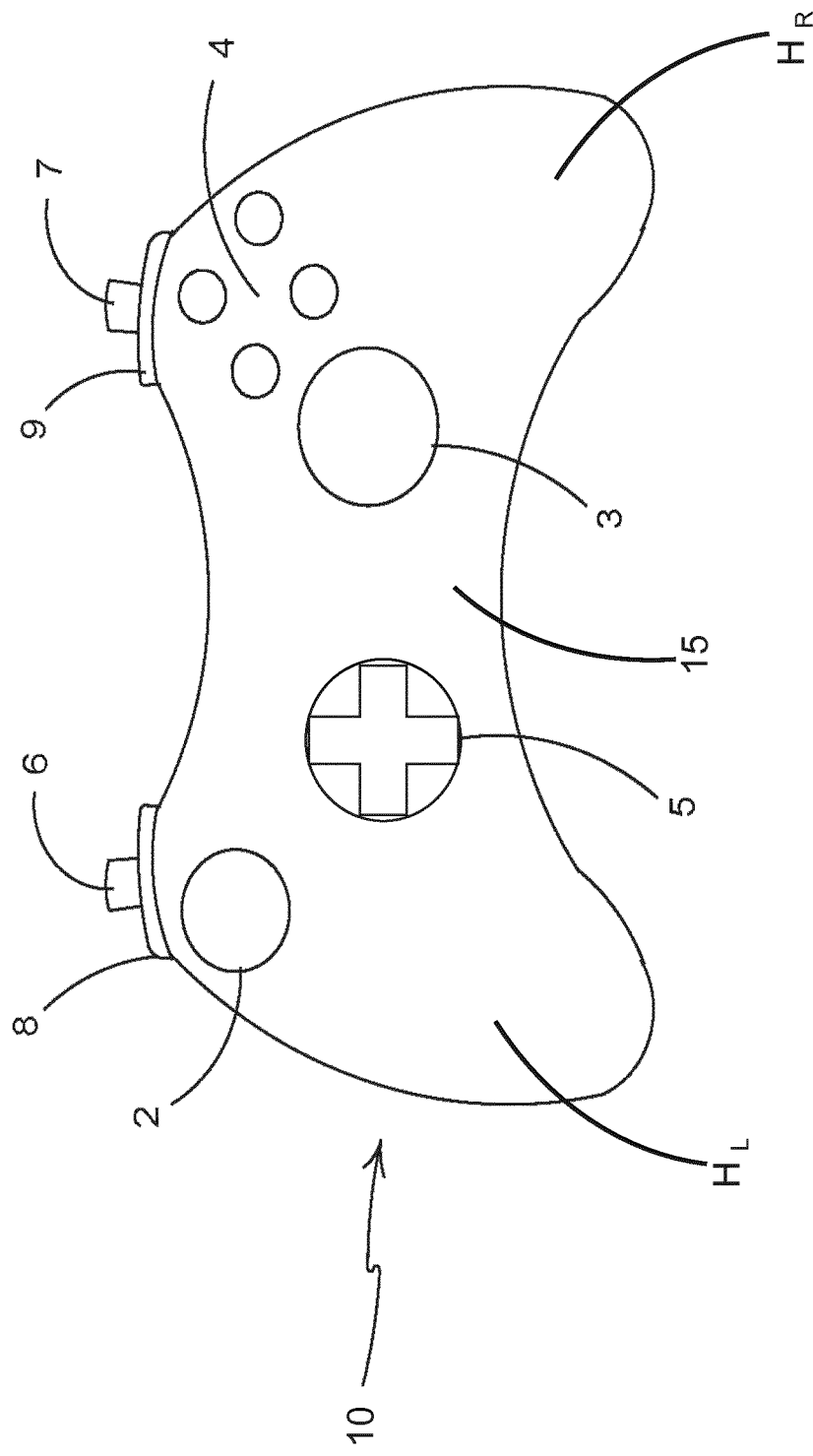
FIG. 1 is a schematic illustration of the front of a games console controller according to a first embodiment showing a plurality of controls thereon.

Referring to FIG. 1, there is shown a controller 10 according to an embodiment of the invention. The controller 10 comprises an arrangement of game controls that are mounted on the front and top of the controller 10. The controller 10 comprises a left analogue thumb stick 2 and a right analogue thumb stick 3 mounted on the front of the controller 10. The left analogue thumb stick 2 and the right analogue thumb stick 3 normally control movement actions and are intended to be operated by the user's left and right thumbs respectively. The controller 10 comprises four buttons 4, located on a forward right portion of the front of the controller 10, which normally control additional in-game actions and that are intended to be operated by the user's right thumb. The controller 10 comprises a direction pad 5 located on the rearward left portion of the front of the controller 10. The direction pad 5 is intended to be operated by the user's left thumb, and typically is used either as an alternative to the left thumb stick 2, or to provide additional actions. The controller 10 also comprises a left trigger body 6, a right trigger body 7, a left bumper 8 and a right bumper 9 located on the top of the controller 10. The left and right trigger bodies 6, 7 are typically operated by a user's index fingers or forefingers. The left and right bumpers 8, 9 may also be operated by a user's index fingers or forefingers. It will be understood that the arrangement of game controls illustrated in respect of the present embodiment is optional and may vary in other game controllers embodying the present invention, which may be applied to a variety of actuators or controls as described below.

Figure 2:
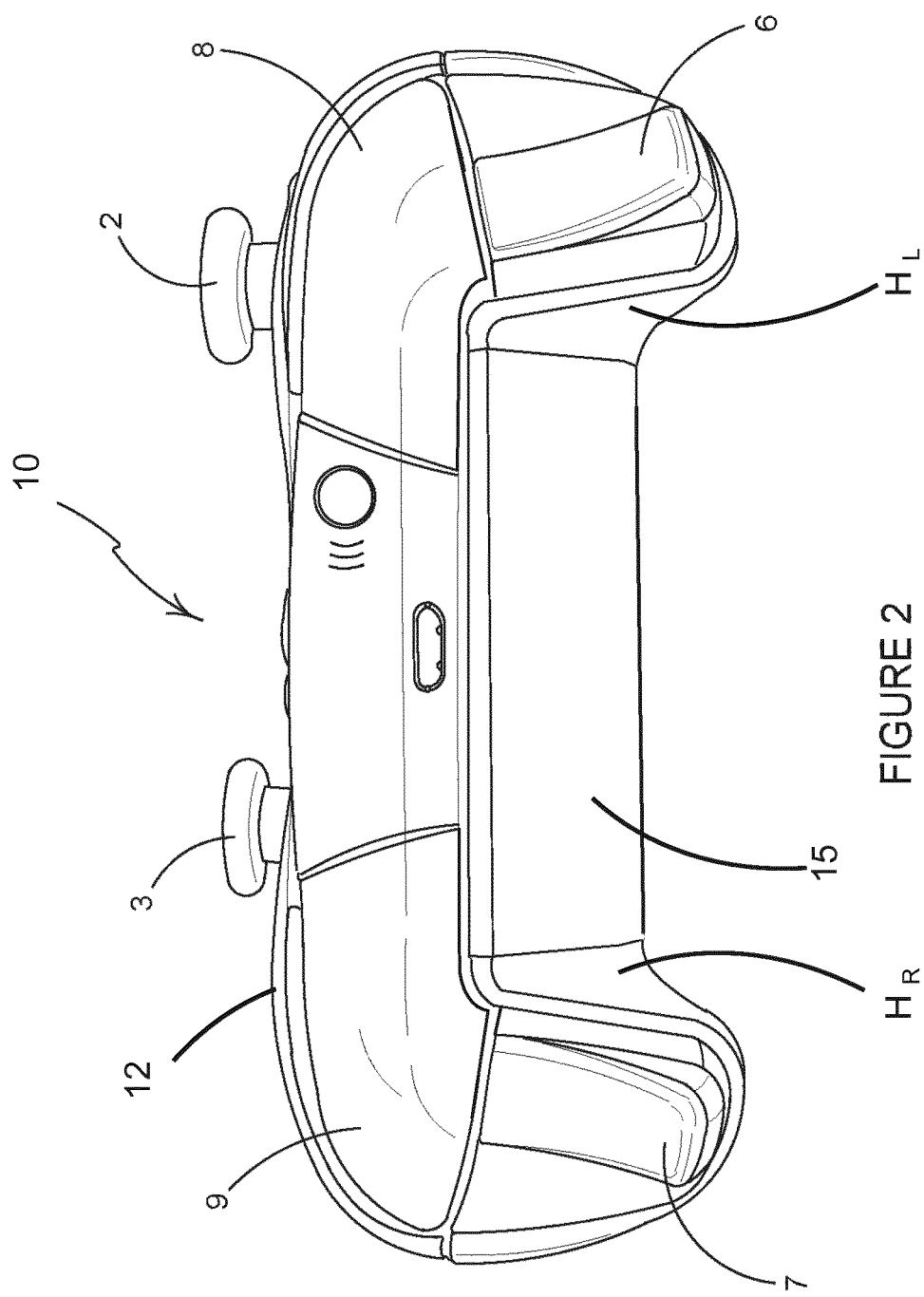
FIG. 2 is a top view of the games console controller of FIG. 1.

FIG. 2 illustrates a top view of the controller 10 of FIG. 1. It can be seen that the left trigger body 6 is mounted below the left bumper 8 and the right trigger body 7 is mounted below the right bumper 9.

A user may operate the four buttons 4 on the front of the controller by removing their right thumb from the right thumb stick 3 and placing their right thumb upon one or more of the four buttons 4. This operation takes time and, in some games, can cause a loss of control. This is a particular problem in applications requiring precision, for example combat games, where the right thumb stick 3 is used for aiming a weapon's cross-hair or other reticle.

A user may operate the direction pad 5 on the front of the controller by removing their left thumb from the left thumb stick 2 and placing their left thumb upon the direction pad 5. This operation takes time and, in some games, can cause a loss of control. This is a particular problem in applications requiring precision.

A similar problem may arise when a user operates the four buttons 4 on the front of the controller by removing their right thumb from the right thumb stick 3 and placing their right thumb upon one or more of the four buttons 4.

In light of the above, there is a need for an improved controller which overcomes or mitigates against the aforesaid problem with changing between controls on the front of the controller 10.

The controller 10 comprises a first handle $H_R$ and a second handle $H_L$. The first handle $H_R$ and the second handle $H_L$ are disposed on opposing lateral sides of a central body portion 15. The first handle $H_R$ is intended to be grasped in the right hand of a user. The second handle $H_L$ is intended to be grasped in the left hand of a user. The user wraps one or more of the middle, ring and little fingers of the right hand about the first handle $H_R$. The user wraps one or more of the middle, ring and little fingers of the left hand about the second handle $H_L$.

Figure 4:
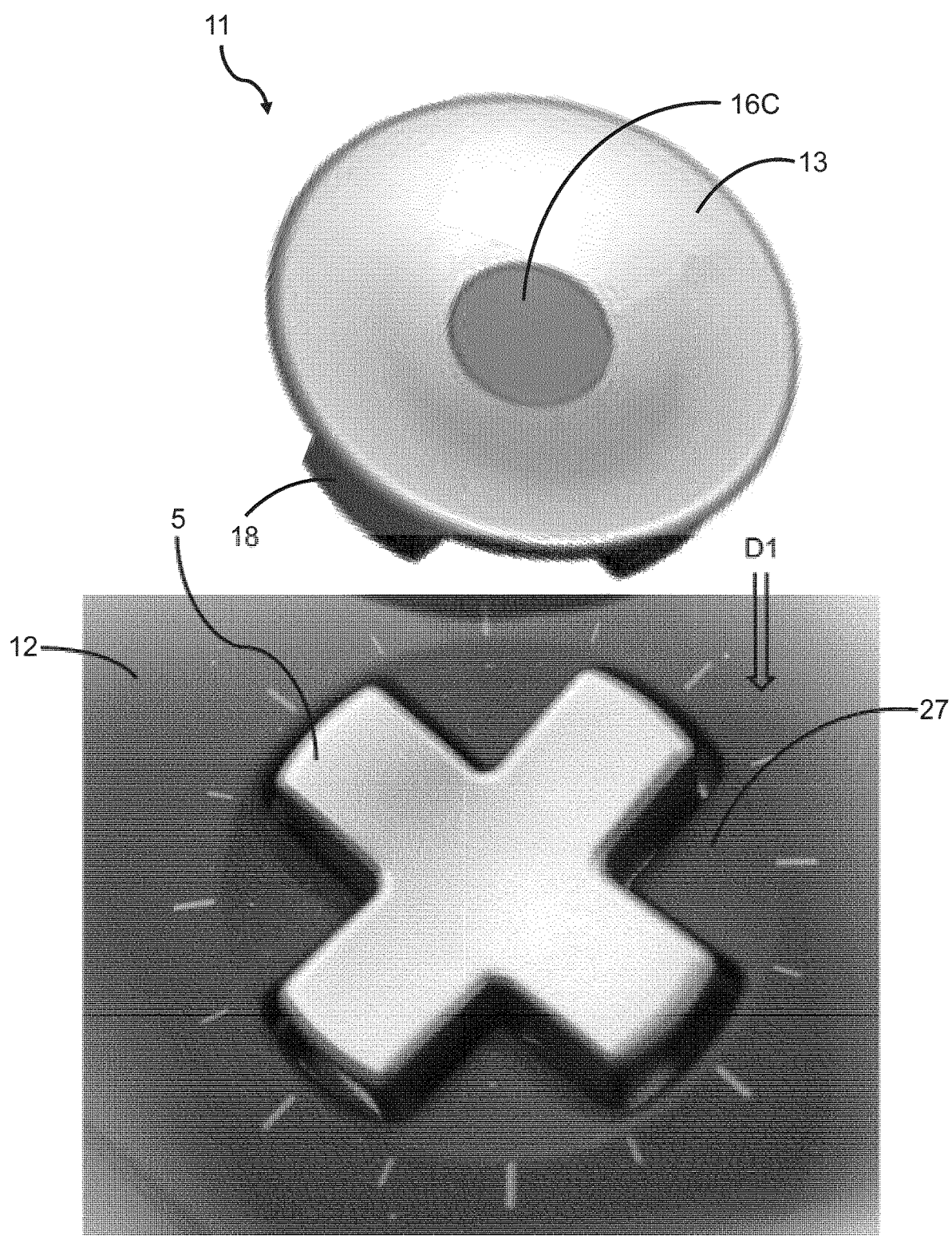
FIG. 4 is an enlarged view of a portion of the front of the games controller of FIG. 1 in which the control of FIGS. 3A to 3D is detached from the controller.

In the illustrated embodiment the direction pad 5 comprises a cross shaped button at least partially extending through a complementary cross shaped aperture in the casing 12 of the controller, see FIG. 4.

In other embodiments the direction pad 5 may comprise four button members coupled to, mounted to, or integrally formed with a cross shaped body. Each of the four button members passes at least partially through a respective aperture in the casing 12. The cross shaped body is disposed internally of the casing 12.

In yet other embodiments the direction pad 5 may be alternatively arranged for example it may take the form of a large circular button passing through a circular aperture in the casing 12. The button may comprise indicia such a raised embossments or mouldings which indicate the directions of the switches or actuators disposed therebelow.

FIGS. 3A to 3D illustrate an actuator device 11 for being fitted to a direction pad 5. The actuator device 11 comprises a pad or plate 13. In the illustrated embodiment the plate 13 is patelliform in shape, dished or sunken at the centre, that is to say concave. In alternative embodiments other shapes may be employed; for example, but not limited to, a planar or flat shape.

An aperture 14 is provided at the centre of the plate 13. Optionally the plate 13 may be circular so as to form an annulus.

The actuator device 11 comprises a mounting 18. The mounting 18 comprises walls 19 defining an orifice 20 for receiving at least a portion of the direction pad 5. The mounting 18 is configured to be complementary in shape to the portion of the direction pad 5 which projects outwardly of the casing 12 of the controller 10.

Figure 3C:
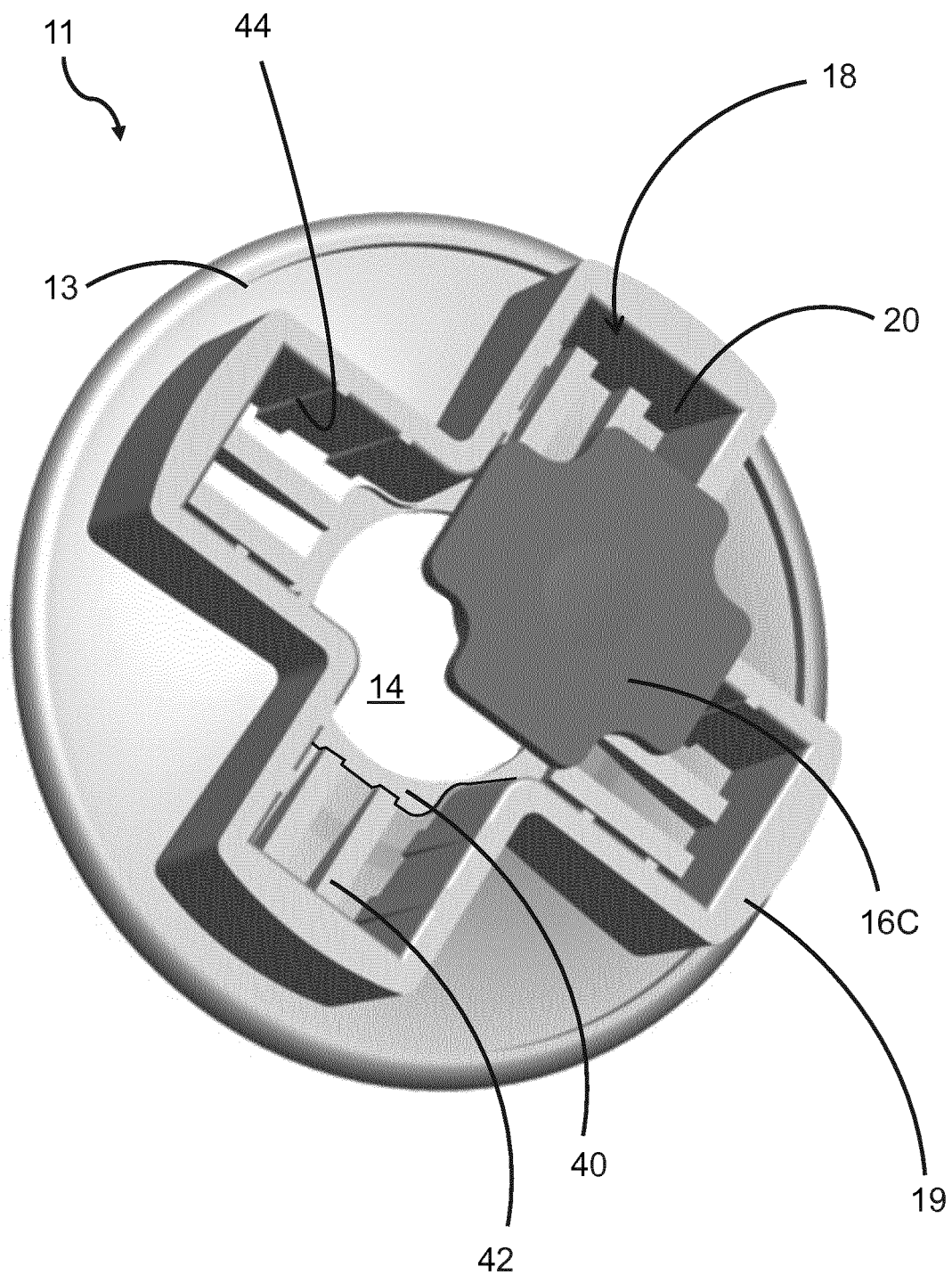

In the illustrated embodiment the walls 19 of mounting 18 define a cross shaped recess or orifice 20 for receiving the portion of the direction pad 5 which protrudes through the casing 12, see FIGS. 3C and 4.

The actuator device 11 comprises or can accommodate a grip member 16A, 16B, 16C. The grip member 16A, 16B, 16C may be interchangeable, that is to say it is detachable so as to be replaceable with another grip member 16A, 16B, 16C.

A grip member 16A, 16B, 16C, may be selected and is inserted into the recess or orifice 20 in the mounting 18 and a portion of the grip member 16A, 16B, 16C is received in the aperture 14. Said portion of the grip member 16A, 16B, 16C may protrude through the aperture 14. In other embodiments said portion of the grip member 16A, 16B, 16C may be arranged to be flush with the portion of the plate 13 proximate the aperture 14.

The grip member 16A, 16B, 16C comprises a retainer for preventing the grip member from passing through the aperture 14. In the illustrated embodiment, the retainer takes the form of a plurality of lugs 17 arranged to form shoulders such that the grip member 16A, 16B, 16C is larger in dimension than the aperture 14. FIG. 3B illustrates four lugs circumferentially arranged, although two opposing lugs may suffice; more than two lugs may be provided about the periphery of the grip member 16A, 16B, 16C. In other embodiments other arrangements may be employed to form the shoulder, for example, but not limited to, an annular or ring shaped projection or ledge about the grip member 16A, 16B, 16C.

The grip member 16A, 16B, 16C may be secured in position by a clip mechanism. In alternative embodiments the grip member 16A, 16B, 16C is secured in position by friction or interference fit.

The grip member 16A, 16B, 16C may be received in a recess or rebate 40 in the lower or inner surface of the plate 13. The recess or rebate 40 may comprise an undercut for holding the lugs 17 of the grip member 16A, 16B, 16C.

The lower or inner surface of the plate 13 may comprise one or more ridges 42, the one or more ridges may extend beyond the recess or rebate 40 so as to engage with a lower surface of the grip member 16A, 16B, 16C formed by the lugs 17, thereby holding the grip member 16A, 16B, 16C in position.

The one or more ridges 42 may also be shaped to be complementary to the upper surface of the direction pad 5. The one or more ridges 42 may rest upon the upper surface of the direction pad 5.

The walls 17 of the mounting 18 comprise an inner surface, the inner surface may comprise one or more projections 44 extending inwardly therefrom. Each of the one or more projections 44 may be tapered or wedge shaped. The one or more projections 44 being arranged such that the thin end of the wedge is proximate the orifice 20 and the thick end of the wedge is proximate the lower surface of the plate 13. In this way the one or more projections 44 may facilitate tightening of the actuator device 11 as it is pressed onto the direction pad 5.

The grip member 16C is arranged such that the upper surface of the portion of the grip member which is received in the aperture 14 is substantially flat.

The grip member 16B is arranged such that the upper surface of the portion of the grip member which is received in the aperture 14 comprises one or more ridges or bosses projecting upwardly from a substantially flat plane. In the illustrated embodiment each of the one or more ridges takes the form of a ring; the rings are concentrically arranged about the centre of the aperture 14. In other embodiments other arrangements may be employed for example, but not limited to, a plurality of knobs or substantially hemispherical protuberances.

The grip member 16A is arranged such that the upper surface of the portion of the grip member which is received in the aperture 14 is substantially convex in shape when viewed from above.

In the illustrated embodiment the grip member 16A comprises a mound or rounded protrusion centred in the aperture 14.

In yet other embodiments the grip member 16A, 16B, 16C may be adhesively secured in position, in such embodiments the grip member 16A, 16B, 16C may not be interchangeable. In still other embodiments the grip member 16A, 16B, 16C may be overmoulded onto the plate 13 of the actuator device 11. Such overmoulding may be achieved for example, but not limited to, by injection moulding, such that a second material is moulded onto a first material.

The first material may be a rigid material such as a metal or rigid plastics material. The second material may be a rubberised material or plastics material which is softer, flexible or deformable material which may provide greater comfort to the user. The second material may be formed from a material which increases the friction between the user's hands and the actuator device.

Figure 5:
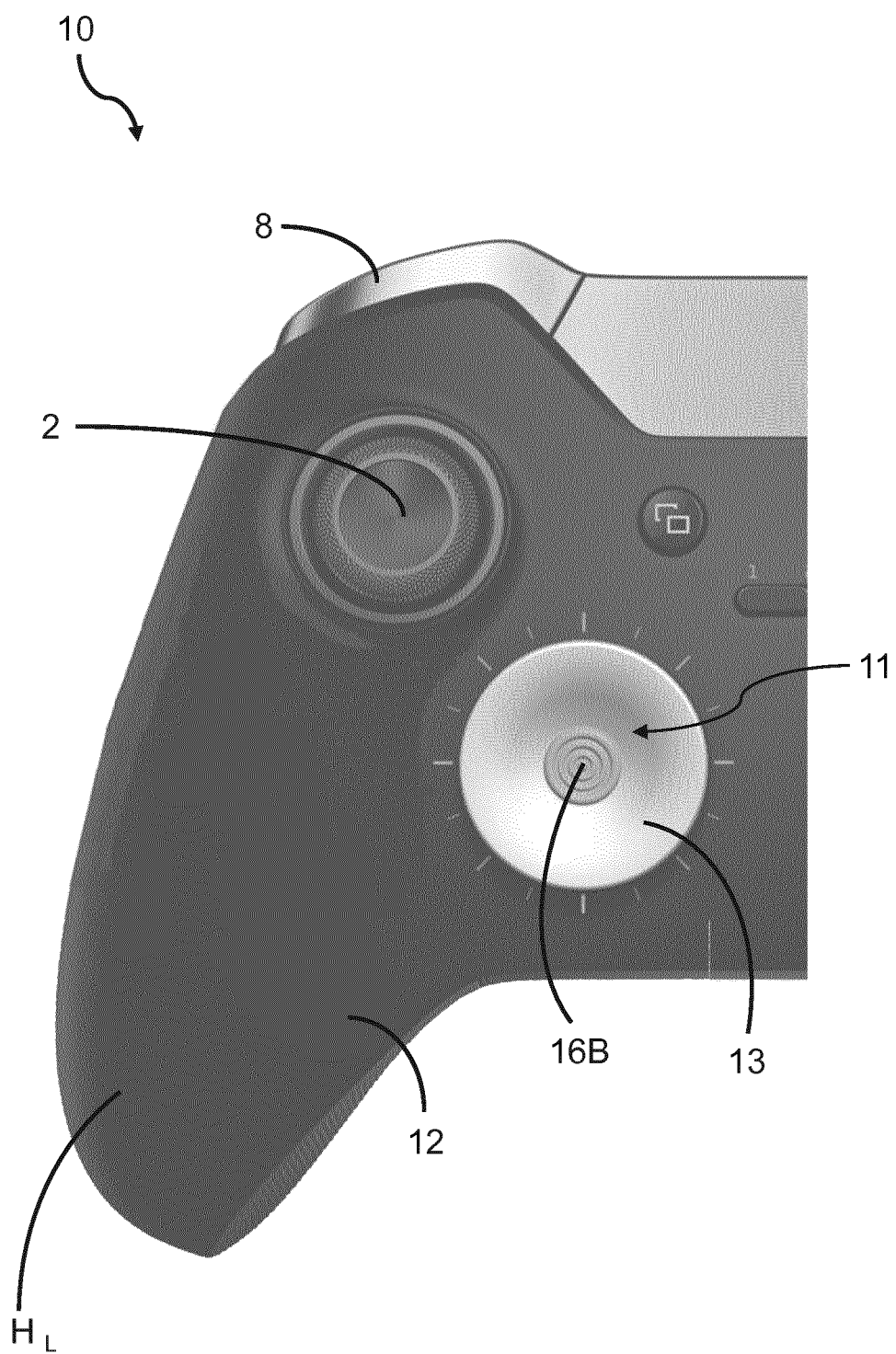
FIG. 5 is a perspective view of a portion of the front of the games controller of FIG. 1 in which the control of FIGS. 3A to 3D is mounted to the controller.
Figure 6:
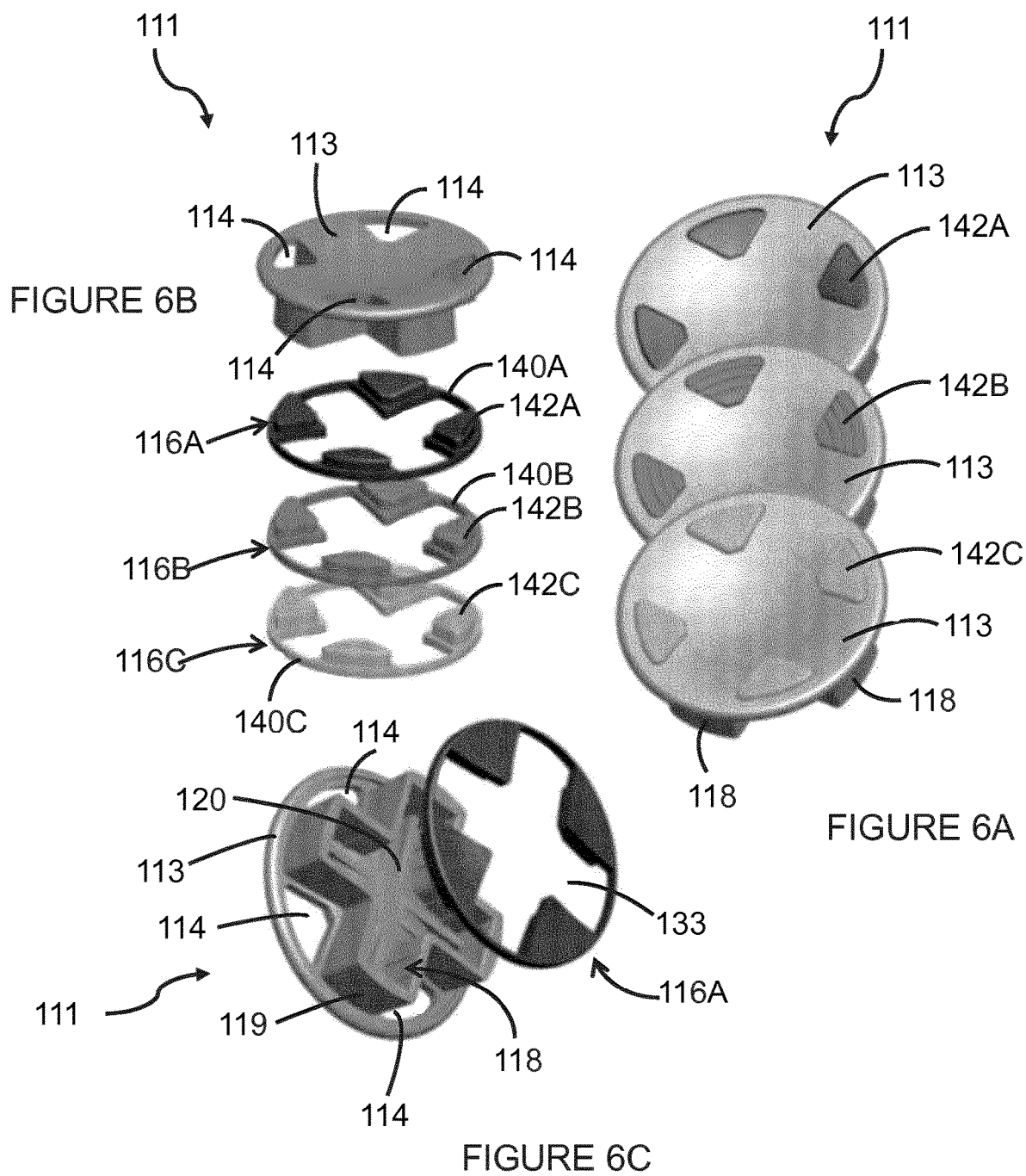
FIGS. 6A to 6C are perspective views of an actuator according to a second embodiment for being employed with the controller of FIG. 1.

FIG. 5 illustrates a controller 10 in which an actuator device 11 has been mounted on the direction pad 5. The portion of the direction pad 5 protruding through the casing 12 has been received in the orifice 20 of the actuator device 11. The actuator device 11 is held in position by an interference fit.

The portion of the direction pad 5 protruding through the casing 12 may assist the retention of the grip member 16B in the aperture 14 by supporting the grip member 16B from below so as to encourage or force the grip member 16B into the aperture 14. The lugs 17 of the grip member 16B prevent the grip member from passing through the aperture 14.

In alternative embodiments the actuator device 11 may be integrally formed with the direction pad 5.

Referring now to FIGS. 6A to 6C and 7 there is shown an additional embodiment of the present disclosure. In the second illustrated embodiment like numerals have, where possible, been used to denote like parts, albeit with the addition of the prefix "100" to indicate that these features belong to the second embodiment. The additional embodiment shares many common features with the first embodiment and therefore only the differences from the embodiment illustrated in FIGS. 1 to 5 will be described in detail.

FIGS. 6A to 6C illustrate an actuator device 111 for being fitted to a direction pad 5. The actuator device 111 comprises a pad or plate 113. In the illustrated embodiment the plate 113 is patelliform in shape, dished or sunken at the centre, that is to say concave. In alternative embodiments other shapes may be employed; for example, but not limited to, a planar or flat shape.

Four apertures 14 are provided proximate the peripheral edge of the plate 113. Optionally the plate 113 may be circular. The plate 113 and apertures 114 may be arranged to define a cruciform or cross shaped central portion or spokes bounded by a ring or rim.

Each of the apertures 114 of the illustrated embodiment are shaped in the form of a sector of a circle, each sector has been truncated to remove the nose or point. The apertures 114 may be substantially quadrant shaped.

In alternative embodiments, the apertures 114 may have a substantially trapezoidal or triangular or other shape.

The actuator device 111 comprises a mounting 118. The mounting 118 comprises walls 119 defining an orifice 120 for receiving at least a portion of the direction pad. The mounting 118 is configured to be complementary in shape to the portion of the direction pad 5 which projects outwardly of the casing 112 of the controller 110.

In the illustrated embodiment the walls 119 of mounting 118 define a cross shaped recess or orifice 120 for receiving the portion of the direction pad which protrudes through the casing 112.

The actuator device 111 comprises a grip member 116A, 116B, 116C. The grip member 116A, 116B, 116C may be interchangeable, that is to say it is detachable so as to be replaceable with another grip member 116A, 116B, 116C.

The grip member 116A, 116B, 116C comprises a plurality of grip elements 142A, 142B, 142C, for example four, in alternate embodiments more or less than four grip elements 142A, 142B, 142C may be provided. Each grip element 142A, 142B, 142C is configured to be complementary in shape to a respective one of the apertures 114.

The plurality of grip elements 142A, 142B, 142C may be coupled or joined together. Each of the plurality of grip elements 142A, 142B, 142C may be coupled to two adjacent neighbours on either side.

The plurality of grip elements 142A, 142B, 142C may be arranged to define a cross shaped aperture 133.

Each grip element 142A, 142B, 142C comprises a shoulder. The shoulder surrounds the periphery of the grip element 142A, 142B, 142C. The shoulder is located proximate a lower end of the grip element 142A, 142B, 142C. The shoulder provides a retainer for preventing the grip element 142A, 142B, 142C passing through the aperture 114.

The shoulder may be formed in part by a rim 140A, 140B, 140C or ring which couples the grip elements 142A, 142B, 142C together. The rim 140A, 140B, 140C may be integral with the grip elements 142A, 142B, 142C.

The grip member 116A, 116B, 116C may be configured to receive the mounting 118. The grip member 116A, 116B, 116C may be arranged to surround the mounting 118.

Each grip element 142A, 142B, 142C is received in a respective aperture 114. A portion of the grip member 116B, 116C may protrude through the aperture 114. In other embodiments said portion of the grip member 116A may be arranged to be flush with the portion of the plate 113 proximate the aperture 114.

The grip member 116A, 116B, 116C or grip elements 142A, 142B, 142C may be secured in position by a clip mechanism. In alternative embodiments the grip member 116A, 116B, 116C or grip elements 142A, 142B, 142C may be secured in position by friction or interference fit.

The grip elements 142A, 142C are arranged such that the upper surface of the portion of the grip elements 142A, 142C, which is received in the apertures 114, is substantially flat.

The grip element 142B is arranged such that the upper surface of the portion of the grip member which is received in the aperture 114 comprises one or more ridges or bosses projecting upwardly from a substantially flat plane. In the illustrated embodiment each of the one or more ridges takes the form of a curved ridge. Each curved ridge may define part of a circle, the curved ridge may be concentrically arranged. It will be appreciated that in other embodiments the grip element 142B may comprise one or more troughs or debossments.

In other embodiments other arrangements may be employed for example, but not limited to, a plurality of knobs or substantially hemispherical protuberances.

In some embodiments, the grip member 116A, 116B, 116C or grip elements 142A, 142B, 142C may be adhesively secured in position. In still other embodiments the grip member 116A, 116B, 116C or grip elements 142A, 142B, 142C may be overmoulded onto the plate 113. In embodiments in which the plate is also moulded a two-hot moulding process may be employed. In such embodiments the apertures 114 may be omitted or may be replaced with recess or rebates in the upper surface of the plate 113.

The plate 113 may be formed from a first material which may be a rigid material such as a metal or rigid plastics material. The grip member 116A, 116B, 116C or grip elements 142A, 142B, 142C may be formed from a second material which may be a rubberised material or plastics material which is softer, flexible or deformable material which may provide greater comfort to the user. The second material may be a material which provides increased friction between the user's hands and the actuator device 111 than the first material.

Figure 7:
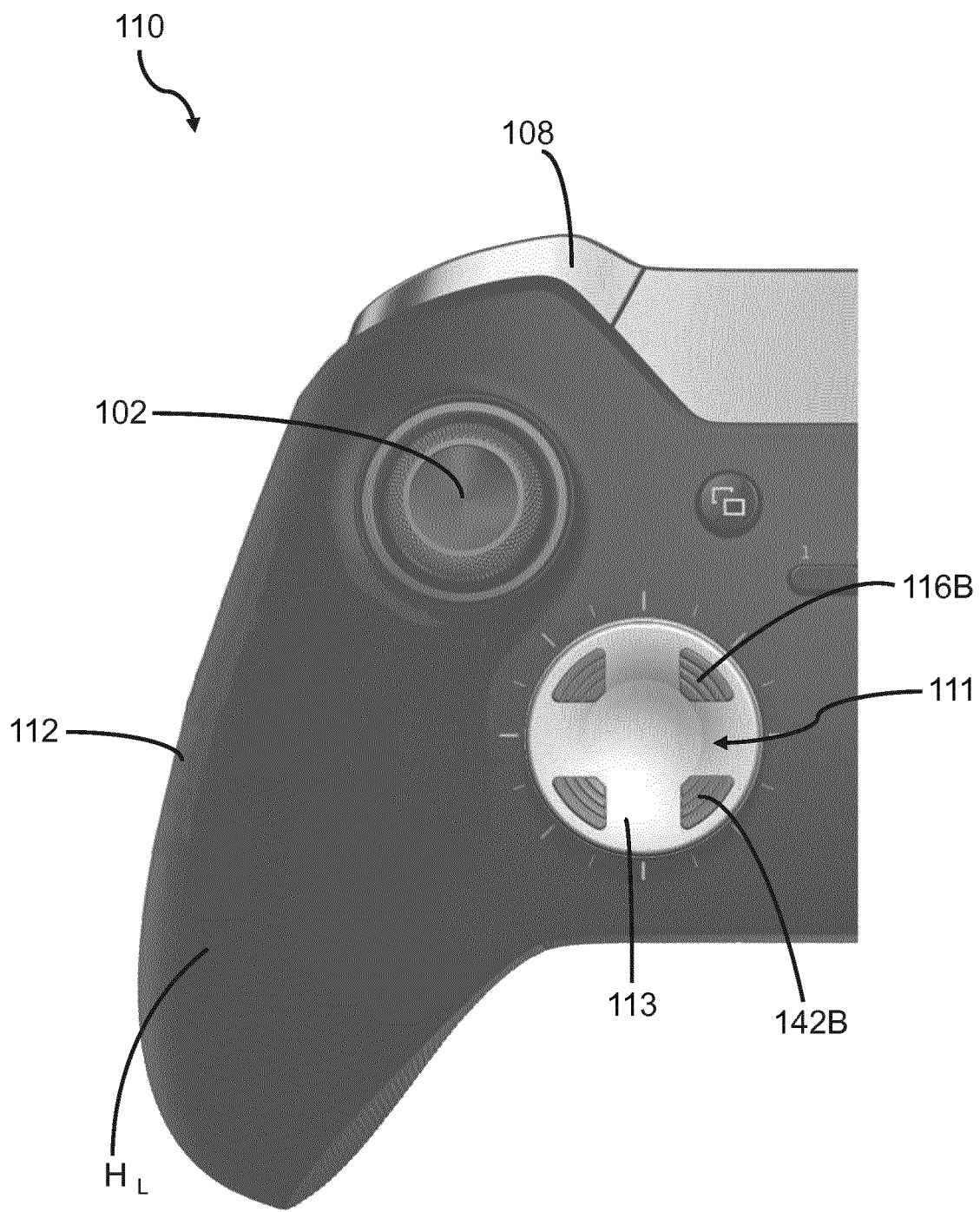
FIG. 7 is a perspective view of a portion of the front of the games controller of FIG. 1 in which the actuator of FIGS. 6A to 6C is mounted to the controller.

FIG. 7 illustrates a controller 110 in which an actuator device 111 has been mounted on the direction pad. The portion of the direction pad protruding through the casing 112 has been received in the orifice 120 of the actuator device 111. The actuator device 111 is held in position by an interference fit.

The portion of the direction pad protruding through the casing 112 may assist the retention of the grip member 116B or grip element 142B in the apertures 114 by supporting the grip member 116B or grip element 142B from below so as to encourage or force the grip member 116B or grip element 142B into the apertures 114. The shoulders of the grip element 142B prevent the grip element 142B from passing through the aperture 114.

Referring now to FIGS. 8A, 8B, 9A and 9B, there is shown an alternative embodiment. In the third illustrated embodiment like numerals have, where possible, been used to denote like parts, albeit with the addition of the prefix "200" to indicate that these features belong to the third embodiment respectively. The alternative embodiment shares many common features with the first and second embodiments and therefore only the differences from the embodiments illustrated in FIGS. 1 to 6C will be described in any greater detail.

FIGS. 8A, 8B, 9A and 9B illustrate an actuator device 211 for being fitted to a direction pad 5 (see FIG. 1). The actuator device 211 comprises a pad or plate 213. In the illustrated embodiment the plate 213 is non planar, it has a raised peripheral edge and a raised mound in the centre so as to have an undulating surface 221. In alternative embodiments other shapes may be employed; for example, but not limited to, a planar or flat shape, or dish shape.

The actuator device 211 comprises a mounting 218. The mounting 218 comprises walls 219 defining an orifice 220 for receiving at least a portion of the direction pad. The mounting 218 is configured to be complementary in shape to the portion of the direction pad which projects outwardly of the casing 212 of the controller 210.

In the illustrated embodiment the walls 219 of mounting 218 define a cross shaped recess or orifice 220 for receiving the portion of the direction pad which protrudes through the casing 212.

Figure 8A:
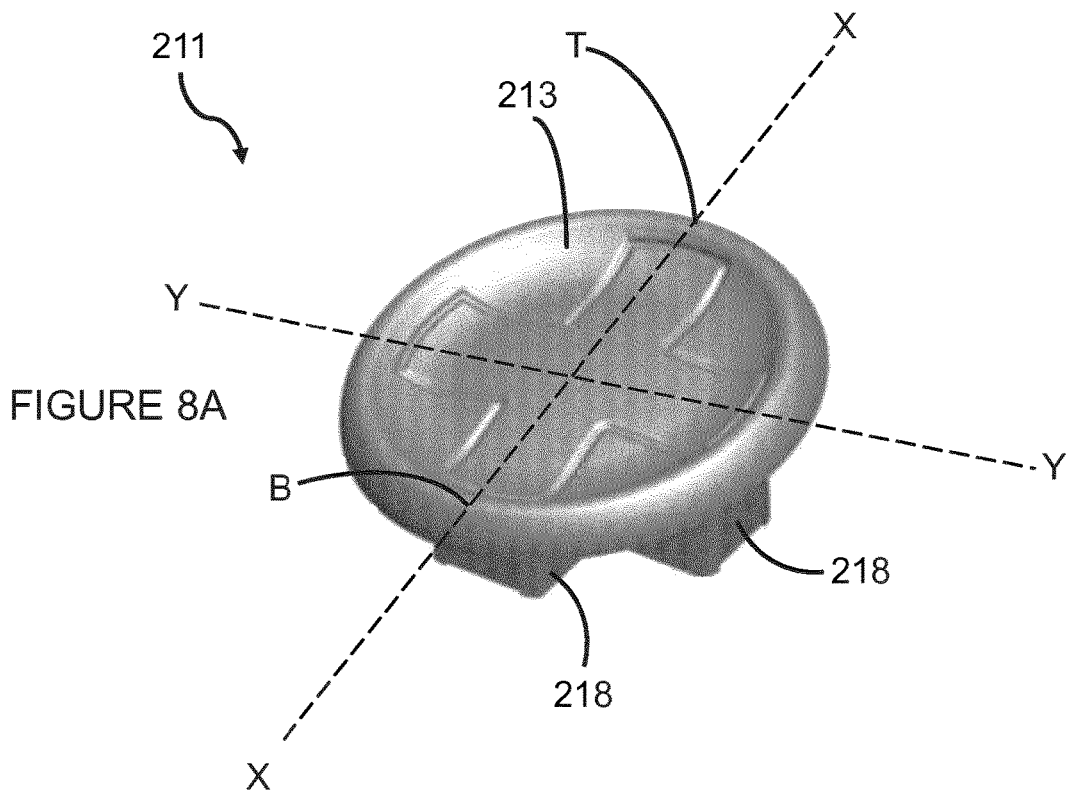
FIGS. 8A and 9A are perspective views of an actuator according to a third embodiment for being employed with the controller of FIG. 1.
Figure 8B:
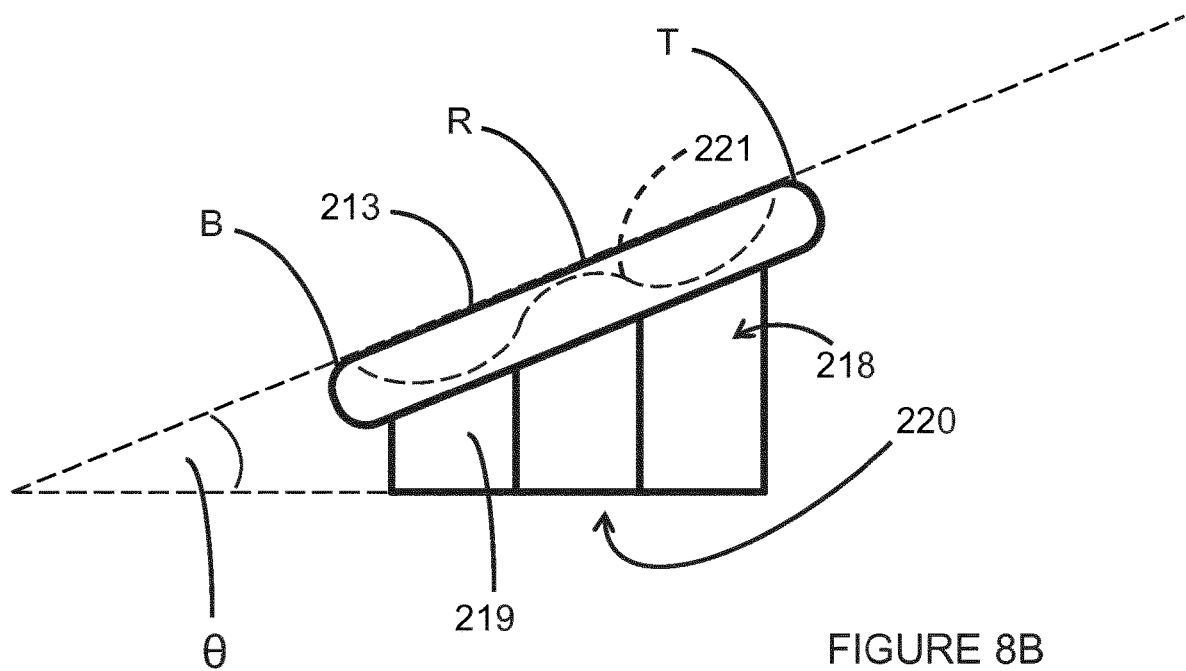
FIG. 8B is a side view of the actuator of FIG. 8A.

The walls 219 of the mounting 218 are arranged such that the actuator device 211 is substantially wedge shaped best shown in FIG. 8B. The plate 213 can be viewed as a bowl having a rim R and an undulating surface 221. The rim R of the bowl and the base of the walls are arranged to define a nonzero angle θ therebetween.

The cross shape of the mounting 218 defines an X direction and a Y direction, see FIG. 8A. The plate 213 is inclined along the X direction. In this way the highest T and lowest B elevations of the rim R lie upon a notional line defining the X direction.

It will be appreciated that the actuator device 211 may be mounted on the direction pad in four different orientations so as to adjust the orientation of the X and Y directions of the actuator device with respect to a longitudinal direction of the controller 210. The longitudinal direction, as indicated by dashed line L in FIG. 9A, extends from the top (to which the right and left triggers 6, 7 are mounted) of the controller 10 to the bottom of the controller 10, see FIG. 1. In this way the plate 213 can be arranged so as to be inclined toward the front of the controller 210, towards the rear of the controller 210, or towards either of the opposing sides of the controller 210 (that is to say towards either the first or second handles $H_R$, $H_L$).

In alternative embodiments, the orientation of the inclination of the plate 213 with respect to the mounting 218 may be altered such that it does not extend along the X or Y direction but may be oriented between the X and Y direction. For example, it may be oriented such that the highest and lowest elevations of the rim lie upon a notional line bisecting the X and Y directions as defined by the cross-shaped mounting 218.

The orientation of the inclination of the plate 213 with respect to the mounting 218 may be configured such that either the highest or lowest elevation of the rim of the plate 213 may be disposed in closest proximity to the proximate thumb stick 202.

Figure 9A:
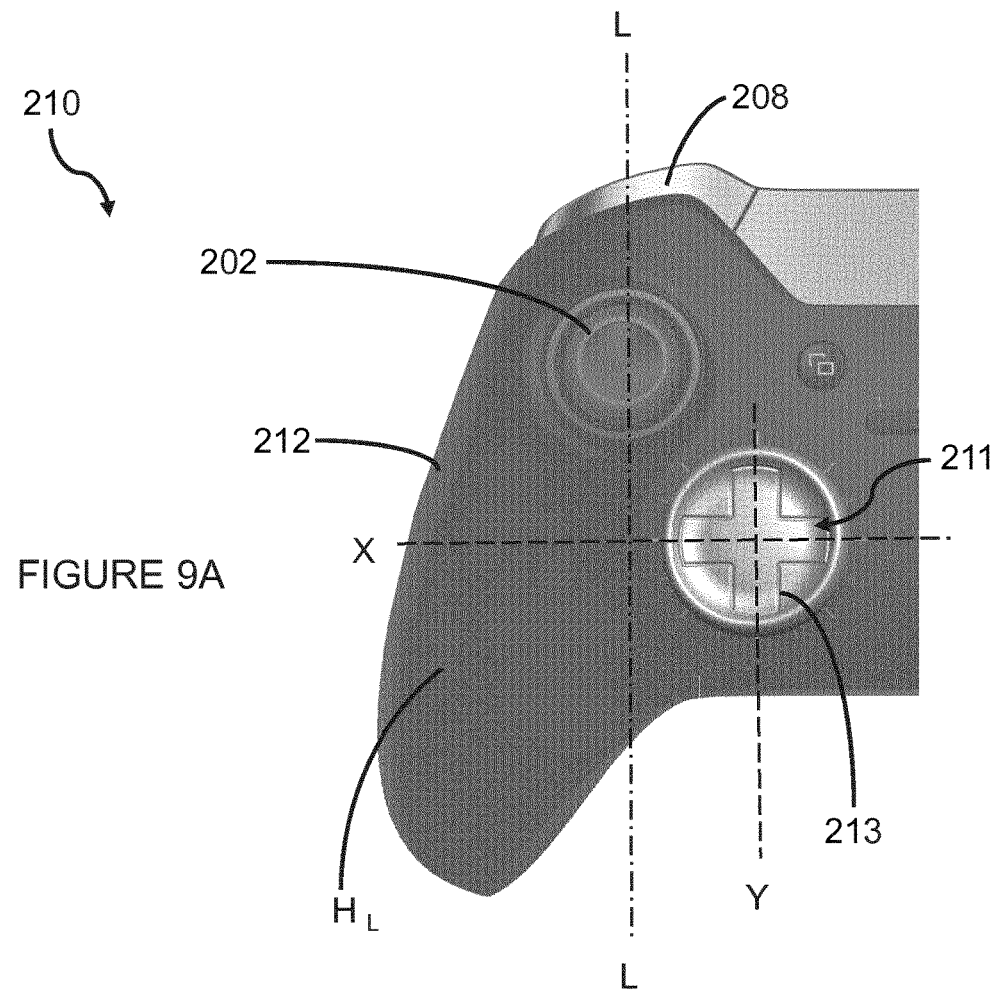
Figure 9B:
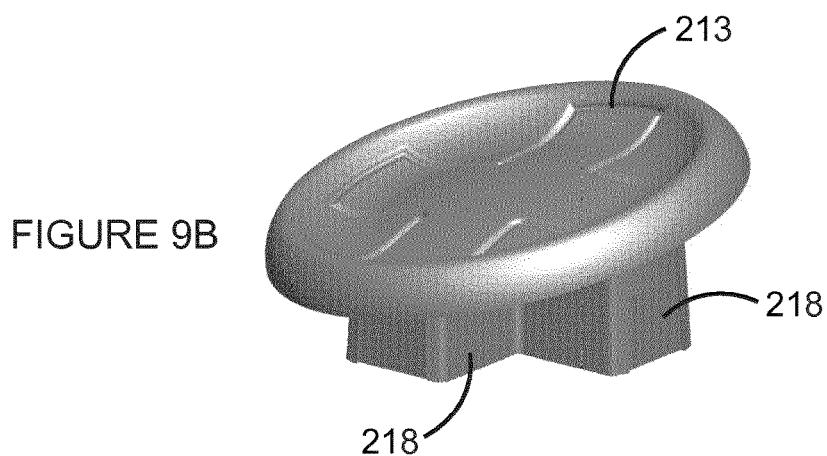
FIG. 9B is a perspective view of a portion of the front of the games controller of FIG. 1 in which the control of FIGS. 8A, 8B and 9A is mounted to the controller.

FIG. 9A illustrates a controller 210 in which an actuator device 211 has been mounted on the direction pad. The portion of the direction pad protruding through the casing 212 has been received in the orifice 220 of the actuator device 211. The actuator device 211 is held in position by an interference fit.

In some embodiments the plate 213 may comprise a grip member or grip elements.

Referring now to FIGS. 10A to 10E, there is shown an alternative embodiment. In the fourth illustrated embodiment, like numerals have, where possible, been used to denote like parts, albeit with the addition of the prefix "300" to indicate that these features belong to the fourth embodiment respectively. The alternative embodiment shares many common features with the first, second and third embodiments and therefore only the differences from the embodiments illustrated in FIGS. 1 to 9B will be described in any greater detail.

FIGS. 10A to 10E illustrate an actuator device 311 for being fitted to a direction pad 5 (see FIG. 1). The actuator device 311 comprises a pad or plate 313. In the illustrated embodiment the plate 313 is non planar, it has a raised peripheral edge to form a dish or bowl shape. In alternative embodiments other shapes may be employed; for example, but not limited to, a planar or flat shape or undulating shape.

The actuator device 311 comprises a mounting 318. The mounting 318 comprises walls 319 defining an orifice 320 for receiving at least a portion of the direction pad. The mounting 318 is configured to be complementary in shape to the portion of the direction pad which projects outwardly of the casing 312 of the controller 310.

In the illustrated embodiment the walls 319 of mounting 318 define a cross shaped recess or orifice 320 for receiving the portion of the direction pad which protrudes through the casing 312.

The cross shape of the mounting 318 defines an X direction and a Y direction.

The orientation of the plate 313 with respect to the mounting 318 can be adjusted or altered by rotating the plate 313 about an axis Z extending perpendicularly through the orifice of the socket 324 and hence the respective positions of the highest T and lowest L points of the rim R of the plate 313 can be rotationally adjusted with respect to the mounting 318. The highest T and lowest L points of the rim R of the plate 313 can be rotated about the axis Z.

The angle of inclination ω (see FIG. 10E) can be adjusted by manipulating the ball mount 328 within the socket 324.

The mounting 318 comprises a socket 324 for receiving a ball mount 328. The socket 318 is centrally located on the mounting 318 so as to lie on the intersection or vertex of the cross shape. In alternative embodiments the plate 313 may be mounted to the mounting 318 by alternative mounting arrangements, for example but, not limited to, a universal joint (a pair of hinges located close together, oriented at 90° to each other), the universal joint may be mounted to the mounting 318 for rotation about the Z axis. Alternatively, two more gimbals, mounted one on the other with orthogonal pivot axes, may be employed, the two more gimbals may be mounted to the mounting 318 for rotation about the Z axis In this way the plate 313 is rotatably or pivotally mounted about two or more orthogonal axes on the mounting 318.

The plate 313 comprises a ball mount 328 which may be centrally disposed and extend from a base or lower surface thereof. The ball mount 328 may be integral with the plate 313. In other embodiments the ball mount 328 may be eccentrically positioned with respect to the plate 313

The mounting 318 comprises a bore 326 which is in communication with the socket 324. The bore 326 is configured to receive set screw 322 having an external thread for securing the ball mount within or the socket. The set screw 322 may be blind (headless) and take the form of a grub screw and comprises an internal drive such as, but not limited to, a hex or torx socket. The set screw may comprise a detent of flat for engaging with the ball mount.

In alternative embodiments an alternative securing mechanism may be employed for example a pin may be received in the bore 326, the pin may be resiliently biased against the ball mount 328 so as to hold the plate 313 in a desired position. The inclination and orientation of the plate 313 may be adjusted by overcoming the biasing force applied to the pin so as to disengage the pin (or other device, such as a clutch plate, to which the pin may be coupled) from the ball mount 328.

The bore 326 may comprise an internal thread complementary to the external thread of the set screw 322. Alternatively, the set screw 322 may be configured to create an internal thread in the bore 326 when driven into the bore 326—self-tapping the bore 326. In still other embodiments the external thread of the set screw 322 may be received in an internal thread provided by an insert disposed within the bore 326.

Figure 10A:
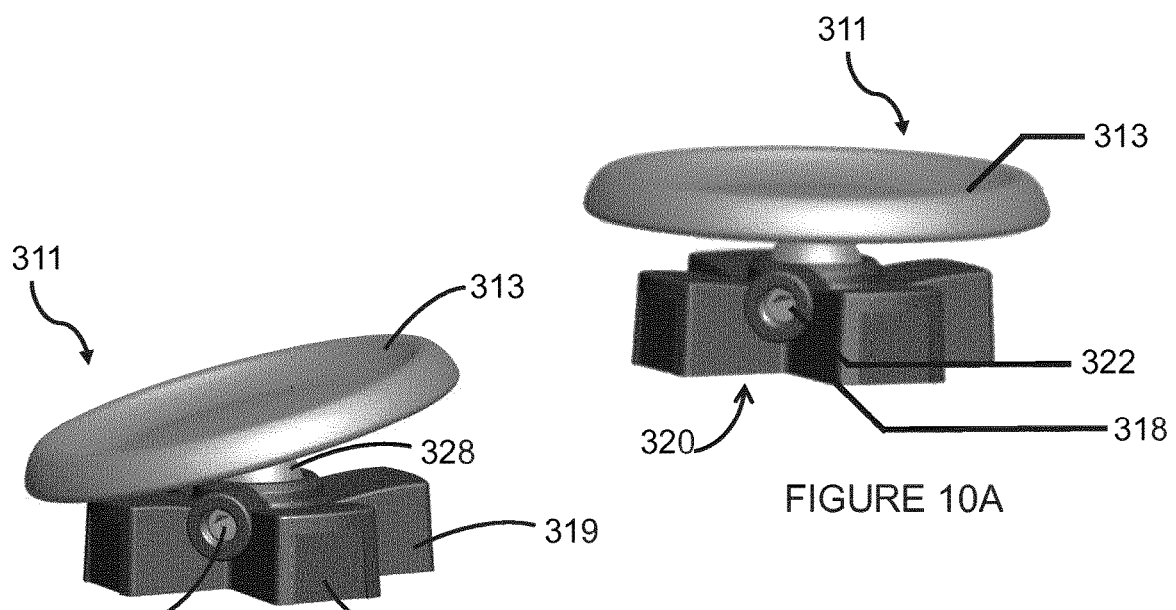
FIGS. 10A to 10C are perspective views of an actuator according to a fourth embodiment for being employed with the controller of FIG. 1.
Figure 10B:

The bore 326 and set screw 322 form a retainer for retaining the ball mount 328 in the socket 324. The bore 326 and set screw 322 also form a clutch for holding the plate 313 in a desired orientation and/or inclination with respect to the mounting 318. FIG. 10A illustrates the plate 313 held in a flat or parallel relationship with the mounting 318. FIG. 10B illustrates the plate 313 held in an inclined relationship with the mounting 318.

Figure 10D:
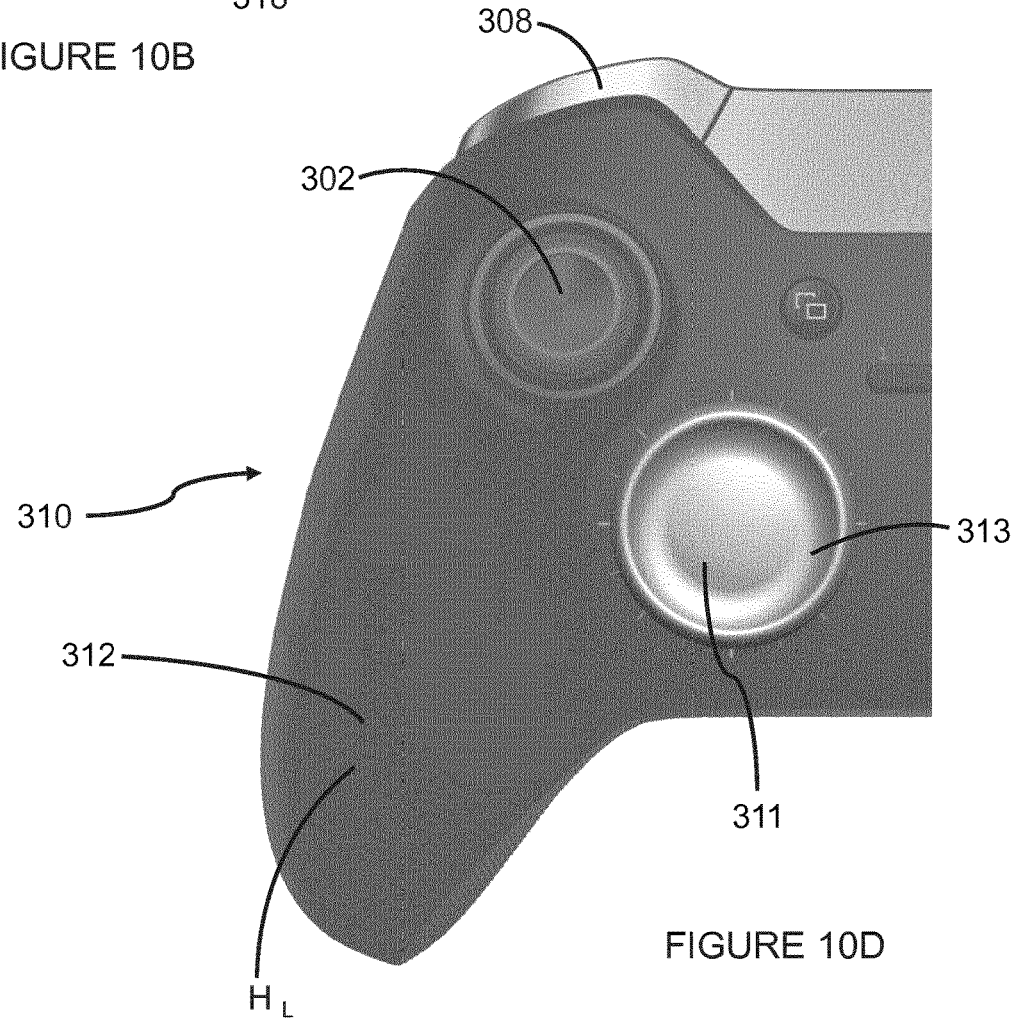
FIG. 10D is a perspective view of a portion of the front of the games controller of FIG. 1 in which the actuator of FIGS. 10A to 10C is mounted to the controller.
Figure 10C:
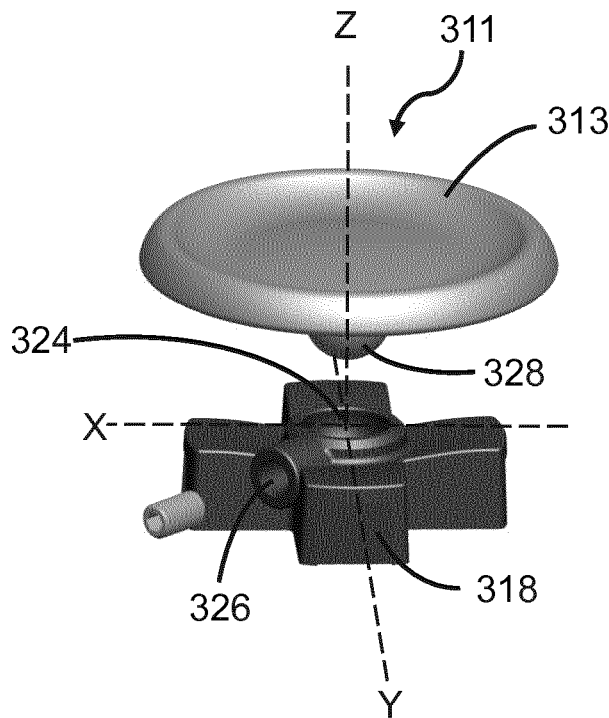
Figure 10E:
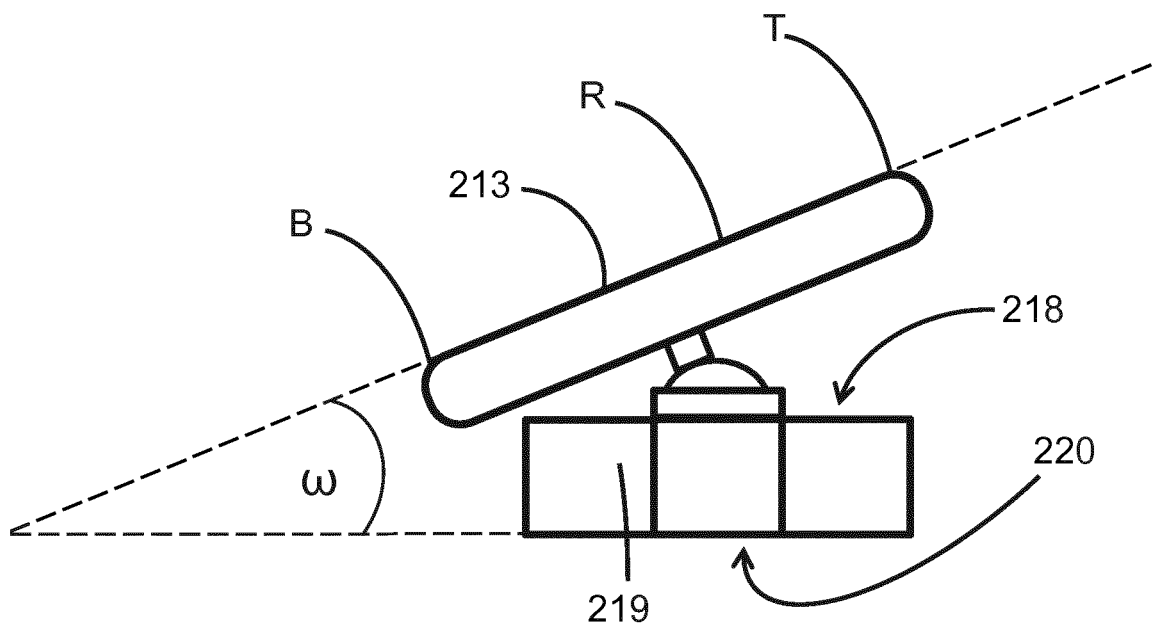
FIG. 10E is a side view of the actuator showing the angle of inclination w.

The plate 313 in the illustrated embodiments has a substantially circular shape when viewed from above, see FIG. 10D, however in alternative embodiments other shapes may be employed for example, but not limited to, the plate 313 may have an elliptical or egg shape.

The actuator device 311 is adjustable such that a user may select or optimise the orientation and/or inclination of the plate 313 with respect to the mounting 318. The plate 313 is secured in the desired position by winding the set screw 322 into the bore 326 until it engages with the ball mount 328. The ball mount 328 is held in position by friction between the ball mount 328 and the socket 324 and between the ball mount 328 and the set screw 322.

FIG. 10D illustrates a controller 310 in which an actuator device 311 has been mounted on the direction pad. The portion of the direction pad protruding through the casing 312 has been received in the orifice 320 of the mounting 318 of the actuator device 311. The actuator device 311 is held on the controller 310 by an interference fit.

Figure 11A:
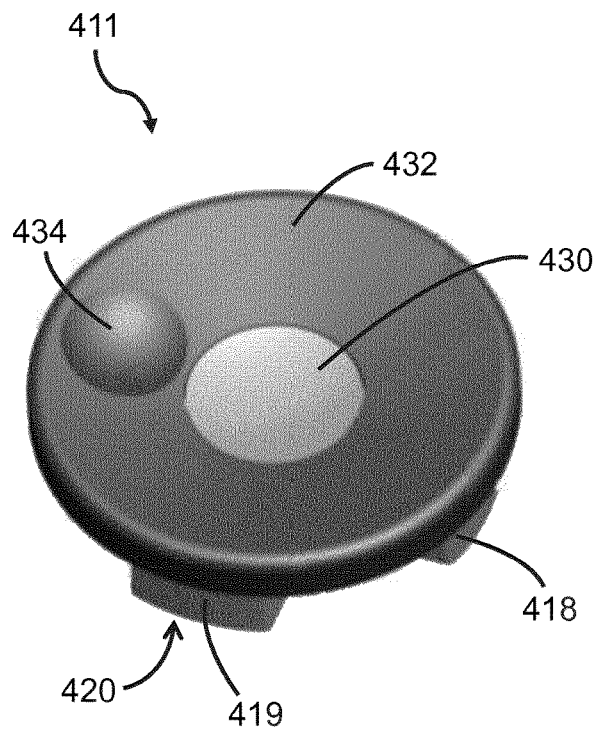
FIGS. 11A and 11B are perspective views of an actuator according to a fifth embodiment for being employed with the controller of FIG. 1.
Figure 11B:
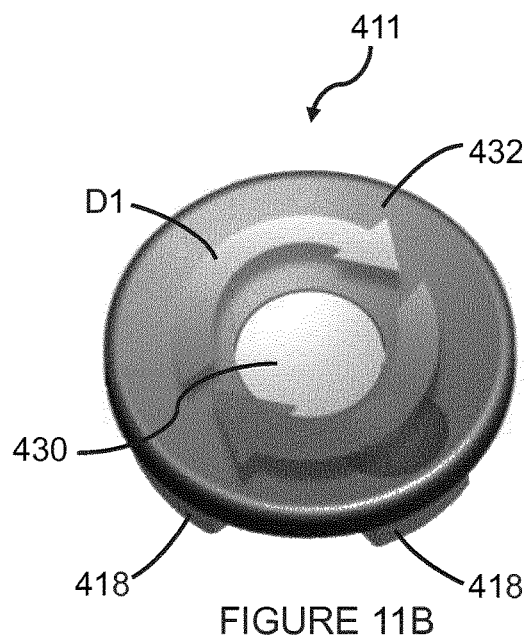
Figure 11C:
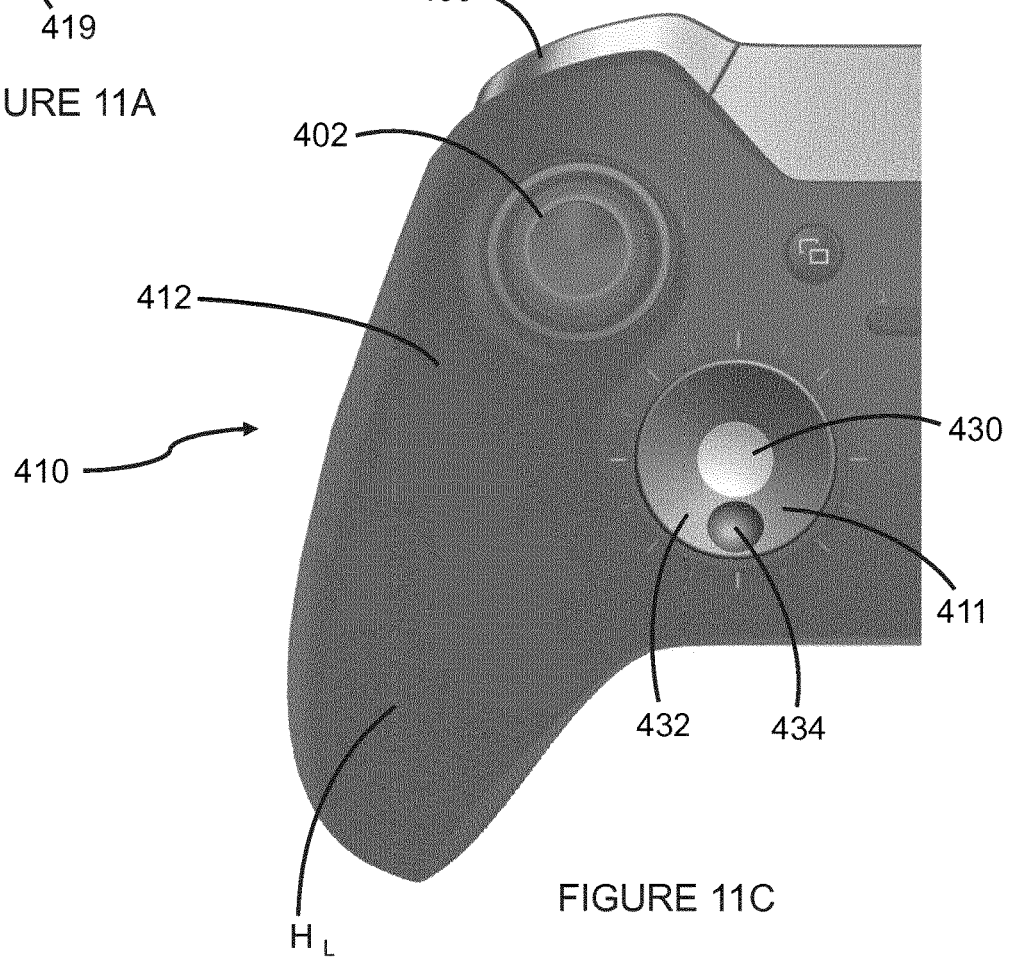
FIG. 11C is a perspective view of a portion of the front of the games controller of FIG. 1 in which the actuator of FIGS. 11A and 11B is mounted to the controller.

Referring now to FIGS. 11A to 11C, there is shown an alternative embodiment. In the fifth illustrated embodiment like numerals have, where possible, been used to denote like parts, albeit with the addition of the prefix "400" to indicate that these features belong to the fifth embodiment respectively. The alternative embodiments share many common features with the first, second, third and fourth embodiments and therefore only the differences from the embodiment illustrated in FIGS. 1 to 10E will be described in any greater detail.

FIGS. 11A to 11C illustrate an actuator device 411 for being fitted to a direction pad 5 (see FIG. 1). The actuator device 411 comprises a pad 432. In the illustrated embodiment the pad 432 is non planar, it has a raised peripheral edge to form an inverted dome, dish or bowl shape.

In alternative embodiments other shapes may be employed; for example, but not limited to, a planar or flat shape or undulating shape.

The actuator device 411 comprises a mounting 418. The mounting 418 comprises walls 419 defining an orifice 420 for receiving at least a portion of the direction pad. The mounting 418 is configured to be complementary in shape to the portion of the direction pad which projects outwardly of the casing 412 of the controller 410.

In the illustrated embodiment the walls 419 of mounting 418 define a cross shaped recess or orifice 420 for receiving the portion of the direction pad which protrudes through the casing 412.

The cross shape of the mounting 418 defines an X direction and a Y direction.

The pad 432 is rotationally mounted to the mounting 418.

In the illustrated embodiment, the pad 432 has centrally disposed aperture for receiving a portion 430 of the mounting 418. The pad 432 is secured to the mounting by a clip mechanism such as a bayonet style fastener. The pad 432 is freely rotatable around the portion 430 of the mounting 418 received in the aperture. In other embodiments, the aperture 418 may be replaced with a recess or blind hole in the base of the plate 418, the portion 430 of the mounting 418 may be received in the orifice of the blind hole.

The pad 432 may comprise a locator 434, the locator 434 may take the form of an indentation or recess in the upper surface of the pad 432. In alternative embodiments the locator 434 may take the form of a raised mound or protrusion extending outwardly from the surface of the pad 432. It still other embodiments the locator 434 may take the form of a grip member or grip element over moulded or otherwise mounted to the pad 432. The locator 434 provides a user with a fixed point of reference on the pad 432. The user may place a finger on the locator 434 and rotate the pad 432 in either direction. The user may press downwardly simultaneously as they rotate so as to sequentially activate the switch mechanisms of the direction pad. This may allow a user to rapidly actuate two or more switch mechanisms in quick succession.

It is envisaged that the controllers may be coupled to a games console or computer by a wired connection or by a wireless connection device.

The actuators may be toollessly coupled to, and uncoupled from, the controller.

It can be appreciated that various changes may be made within the scope of the present invention. Whilst in the foregoing embodiments the actuator mechanism has been described with reference to a hand held games controller for use with a home video games console or other personal computer, in alternative embodiments the actuator mechanism may be employed with other hand held electronic devices, for example but not limited to a portable handheld games console (a single unit comprising the console, screen, speakers, and controls), a mobile telephone, smartphone, tablet computer, phablet computer. The actuator mechanism may be integrated within such portable devices or may form part of an accessory apparatus such as, but not limited to, a case or caddy or other removable jacket arranged to accommodate the portable device.

In some embodiments the first and or second paddle levers may comprise a recess or cutaway on an inner surface thereof, the recess or cutaway being provided to receive the wing portion of the third or fourth paddle lever respectively.

It will be recognised that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An apparatus for supplying user inputs to a computer program for controlling the computer program, the apparatus comprising:
   a case shaped to be held in both hands of a user;
   a plurality of controls located on a front of the apparatus, each of the plurality of controls configured to be operated by the user's thumbs to provide user inputs, a first of the plurality of controls comprising a direction pad configured to active at least four sensors; and
   an actuator for the direction pad, the actuator comprising a plate forming an actuation surface affixed to a mounting, wherein the mounting is configured to couple to the direction pad such that the plate is disposed at an inclination with respect to the case.

2. The apparatus of claim 1 wherein the at least four sensors comprise switches.

3. The apparatus of claim 1 wherein the direction pad is substantially cross- shaped.

4. The apparatus of claim 1 wherein the mounting of the actuator is removably coupled to the direction pad.

5. The apparatus of claim 4 wherein a bottom of the mounting opposite the top of the mounting to which the plate is affixed comprises a cross shaped opening for receiving the direction pad.

6. The apparatus of claim 5 wherein the mounting is substantially crossed shaped.

7. The apparatus of claim 5 wherein the mounting of the actuator is secured to the direction pad by a friction fit.

8. The apparatus of claim 1 wherein the plate is substantially circular in shape.

9. The apparatus of claim 8 wherein the plate is substantially flat.

10. The apparatus of claim 8 wherein the plate comprises a peripheral edge that is raised with respect to the center of the plate.

11. The apparatus of claim 8 wherein the plate comprises a plurality of grip elements projecting upwardly from a top surface of the plate.

12. The apparatus of claim 1 wherein the plate is pivotally attached to the mounting so as to be configurable to a plurality of inclinations with respect to the mounting prior to operation of the one of the plurality of controls.

13. An actuator for use with apparatus for supplying user inputs to a computer program for controlling the computer program, the apparatus comprising:
   a case shaped to be held in both hands of a user; and
   a plurality of controls located on a front of the apparatus, the plurality of controls configured to be operated by the user's thumbs to supply user inputs when the apparatus is held in the user's hands;
   the actuator comprising:
      a mounting configured to couple the actuator to a first control of the plurality of controls; and
      an actuation surface pivotally attached to the mounting such that the actuation surface is configurable to a plurality of inclinations with respect to the mounting.

14. The actuator of claim 13 wherein the mounting is removably coupled to the first control.

15. The actuator of claim 13 wherein the first control comprises a substantially cross shaped direction pad.

16. The actuator of claim 15 wherein a bottom of the mounting opposite the top of the mounting to which the plate is affixed comprises a cross shaped opening for receiving the first control.

17. The actuator of claim 15 wherein the mounting of the actuator is secured to the first control by a friction fit.

18. The actuator of claim 13 wherein the actuation surface is substantially circular.

19. The actuator of claim 13 wherein the actuator surface is attached to the mounting by a ball and sock mechanism.

20. The actuator of claim 13 wherein the actuator further comprises a securing mechanism for securing the actuator surface at a desired inclination with respect to the mounting.

\* \* \* \* \*